June 14, 1932.  A. L. VOUGHT  1,862,778
COMBINATION FRYING PAN AND COOKING OVEN
Filed May 21, 1931
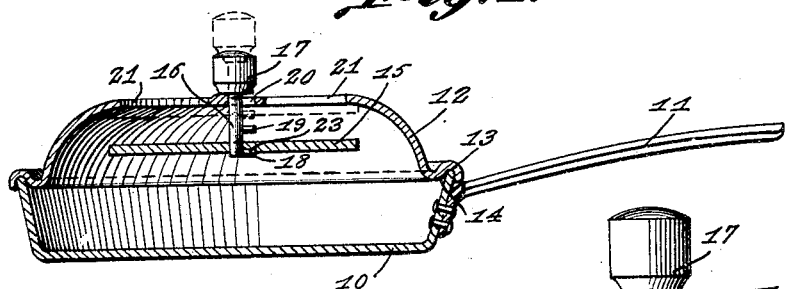
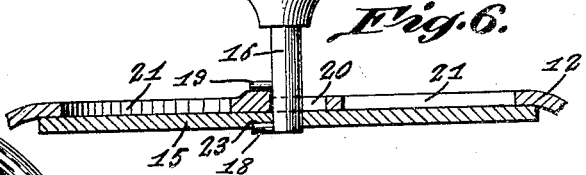
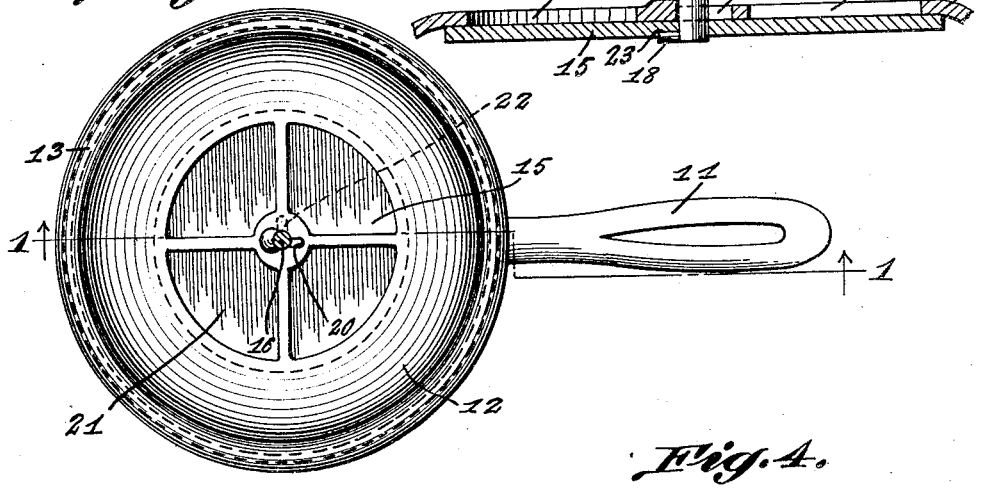
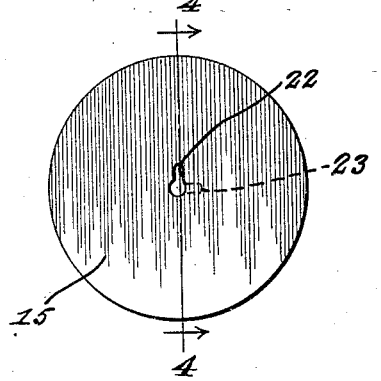
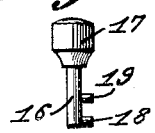
A. L. Vought, INVENTOR
BY Victor J. Evans and Co.
ATTORNEY Patented June 14, 1932

1,862,778

UNITED STATES PATENT OFFICE

ARTHUR L. VOUGHT, OF SPARTA, NEW JERSEY

COMBINATION FRYING PAN AND COOKING OVEN

Application filed May 21, 1931. Serial No. 539,045.

The invention relates to a cooking utensil and especially to a frying pan and cooking oven.

The primary object of the invention is the provision of a utensil of this character wherein when the same is utilized for frying foodstuff the lid or cover thereto is of a construction to prevent spattering of the grease and also in the use of such utensil for baking, the cover will permit the proper venting of the utensil for proper baking purposes.

Another object of the invention is the provision of a utensil of this character wherein the vented cover carries a shutter adapted to permit the opening and closing of the vents according to the desire of the user of the utensil and for the proper frying, baking or roasting operation, the shutter being of novel form and operated in a unique manner.

A further object of the invention is the provision of a utensil of this character which is extremely simple in construction, thoroughly reliable and efficient in its purpose, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:—

Figure 1 is a vertical longitudinal sectional view through a cooking utensil constructed in accordance with the invention and showing the vent shutter by full lines in open position and by dotted lines in closed position.

Figure 2 is a top plan view.

Figure 3 is a bottom plan view of the vent shutter.

Figure 4 is a sectional view on the line 4—4 of Figure 1 looking in the direction of the arrow.

Figure 5 is a detail elevation of the control knob for the vent shutter.

Figure 6 is a fragmentary enlarged sectional view through a portion of the lid or cover of the utensil and vent shutter, the latter being in closed position and latched.

Similar reference characters indicate corresponding parts throughout the several views in the drawing.

Referring to the drawing in detail, the cooking utensil comprises a pan-like body 10 which may be of any required capacity and preferably made from sheet metal material having riveted or otherwise fastened to the side wall thereof the usual handle 11 and adapted to fit upon this body 10 is a lid or cover having an upwardly bulged crown 12 and a marginal channeled annular rim 13, the channel 14 of which accommodates the upper peripheral edge of the side of the body 10 when the lid or cover is placed thereon and in this manner a comparatively tight joint is had between the pan and the lid or cover.

Carried by the lid or cover is a vent shutter 15, the same supported upon the stem 16 of an operating knob 17, the stem being passed through a suitable central opening in the crown 12 of the lid or cover and is adapted to slide and rotate therein.

The stem 16 is preferably attached to the shutter 15 through the medium of a retaining pin 18, while spaced from and above this pin 18 is a latching pin 19, the latter being designed to work through a notch or slot 20 in the lid or cover, the notch or slot opening into the aperture for the stem 16. Thus it will be seen that by pulling upwardly upon the knob 17 the shutter will be raised against the crown of the lid or cover and by having the pin 19 pass through the notch or slot 20 the said shutter 15 can be latched on the turning of the pin onto the non-notched or non-slotted portion of the lid or cover.

The crown of the lid or cover concentrically of the location of the stem 16 is formed with vents or air openings 21, these being controlled by the shutter 15 which when raised against the crown will close the vents or openings 20 and when said shutter is lowered to the position shown in Figure 1 the vents or openings 20 will be uncovered for the ventilation of the cooking utensil when the lid or cover is placed upon the pan 10 thereof.

It will be obvious that when the pan is utilized for frying purposes the grease therein will be prevented from spattering as the shutter 15 constitutes a shield for the vents or openings 20 in the crown of the lid or cover.

When the cooking utensil is utilized for baking or roasting, by adjustment of the shutter 15 the said utensil can be ventilated for regulating the baking and roasting operation.

The shutter is provided with a keyhole-shaped slot 22 for accommodating the stem and the retaining pin 18 so that said shutter 15 can be removably connected with the stem 16 and when the shutter is attached thereto the pin rests in a seat 23 therefor in the under face or bottom surface of the shutter 15.

What is claimed is:—

A cooking utensil of the character described comprising a lid having vents therein, a shutter for opening and closing the vents, a stem operatively mounted in the cover and carrying the shutter for the opening and closing of said vents, and a latching lug on the stem and engageable with the cover to hold the shutter in closing position with respect to the vents, said cover having an opening for accommodating the lug to permit it to be moved from one side of the cover to the other for the latching and unlatching of the shutter.

In testimony whereof I affix my signature.

ARTHUR L. VOUGHT.